United States Patent [19]

Johnson

[11] 4,396,406

[45] Aug. 2, 1983

[54] UNITARY MATRIX, VALVE AND FAN HOUSING FOR ENERGY RECOVERY

[75] Inventor: Arthur C. W. Johnson, Troy, Mich.

[73] Assignee: Combustion Research Corporation, Pontiac, Mich.

[21] Appl. No.: 332,021

[22] Filed: Dec. 18, 1981

Related U.S. Application Data

[63] Continuation of Ser. No. 794,383, May 6, 1977, Pat. No. 4,322,229.

[51] Int. Cl.³ .......................................... B01D 53/04
[52] U.S. Cl. .................................... 55/179; 55/208; 55/387; 165/10; 165/DIG. 2; 165/DIG. 12
[58] Field of Search ................... 55/20, 27, 28, 34, 78, 55/160, 162, 163, 179, 387, 388, 390, 208; 165/4, 7, 10, 50, DIG. 2, DIG. 12; 62/271; 98/33 R, 33 A, 40 C, 41 R

[56] References Cited

U.S. PATENT DOCUMENTS

| 1,547,317 | 7/1925 | Glantzberg | 98/33 R |
|---|---|---|---|
| 1,880,196 | 10/1932 | Dow et al. | 165/4 |
| 2,204,431 | 6/1940 | Moore et al. | 55/179 |
| 2,460,150 | 1/1949 | Schupp | 62/271 X |
| 2,561,441 | 7/1951 | Lou | 55/179 X |
| 2,732,027 | 1/1956 | Wallin | 55/162 |
| 2,862,434 | 12/1958 | Edwards | 165/4 X |
| 3,149,552 | 9/1964 | Stunkard | 98/33 A X |
| 3,368,327 | 2/1968 | Munters et al. | 55/388 X |
| 3,941,185 | 3/1976 | Henning | 165/4 |
| 3,977,466 | 8/1976 | Johansson | 165/7 X |
| 3,978,912 | 9/1976 | Penny et al. | 165/4 |
| 4,048,811 | 9/1977 | Ito et al. | 165/7 X |

FOREIGN PATENT DOCUMENTS

| 38-4315 | 4/1963 | Japan | 55/390 |
|---|---|---|---|
| 270759 | 5/1927 | United Kingdom | 165/4 |

*Primary Examiner*—Robert H. Spitzer
*Attorney, Agent, or Firm*—Krass, Young & Schivley

[57] ABSTRACT

An improved high performance ventilation system for application with relatively small temperature-controlled structures for recovering a high percentage of sensible and latent thermal energy from the exhausted air for return via the fresh air stream. Two matrices of thermally absorbent, expanded honeycomb material are alternately interconnected with fan driven supply and exhaust paths via a valve device to store energy in one matrix while retrieving it from the other. The matrices, valve and fans are contained within a single compact highly portable housing which can be installed on the floor, beneath the ceiling and on the roof of the intended structure. Constant air flow direction is maintained in the ventilated area. The valve may be thermostat controlled. The housing is manufactured with a modular design allowing final on-site assembly in a number of varying configurations.

2 Claims, 10 Drawing Figures

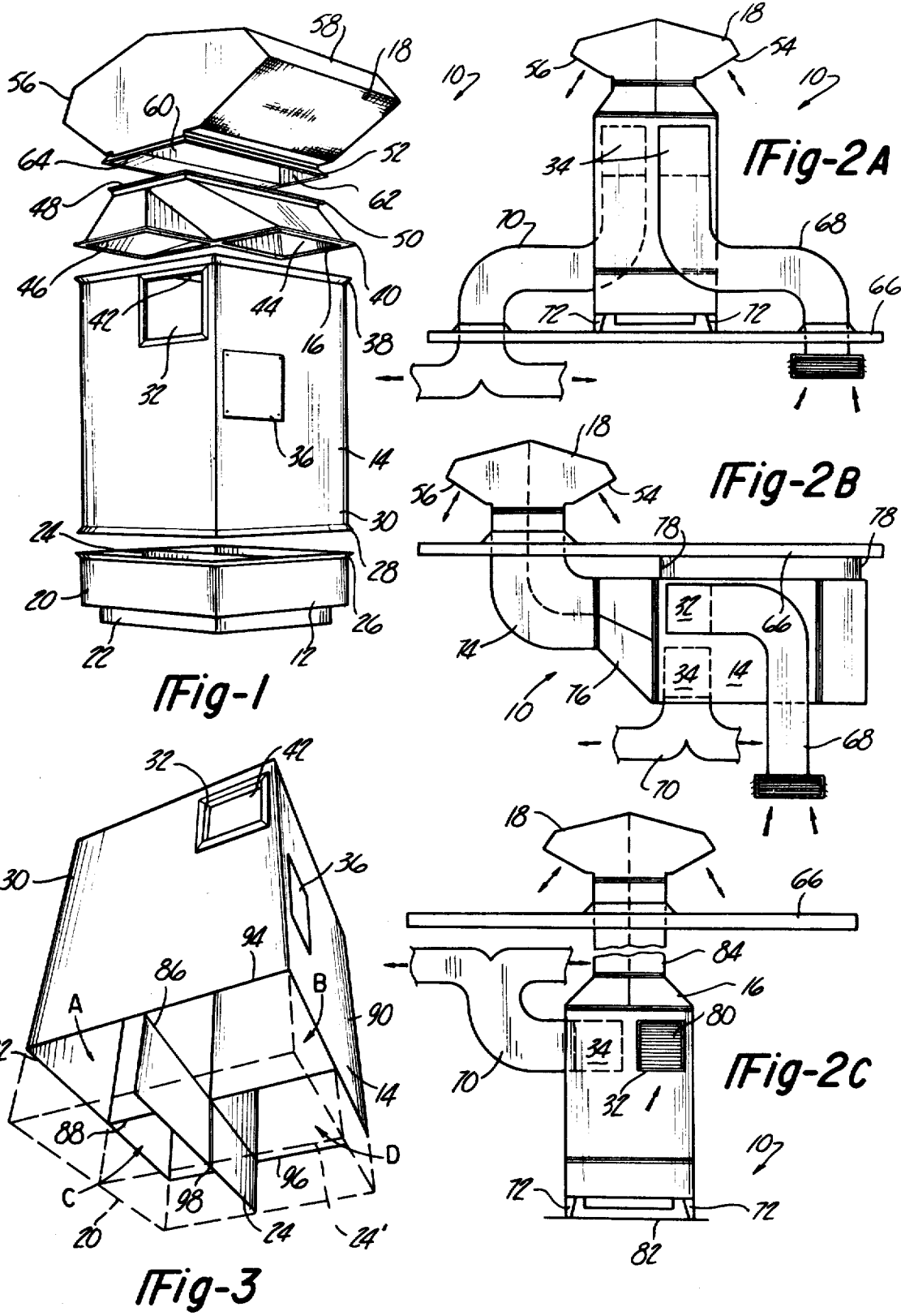

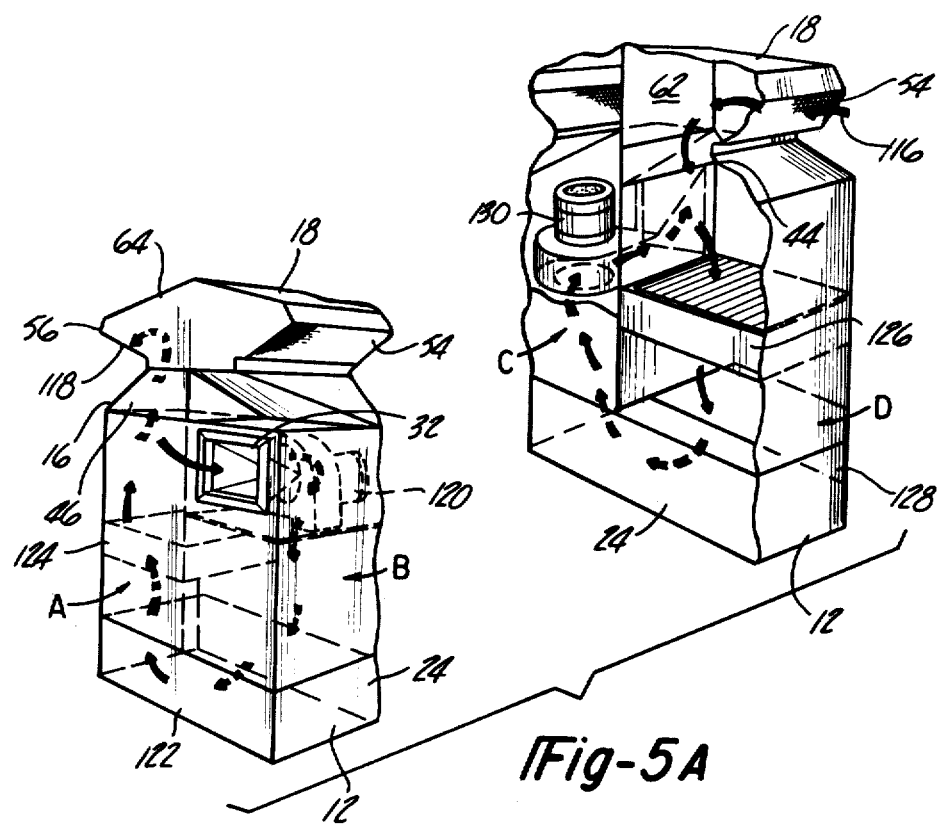
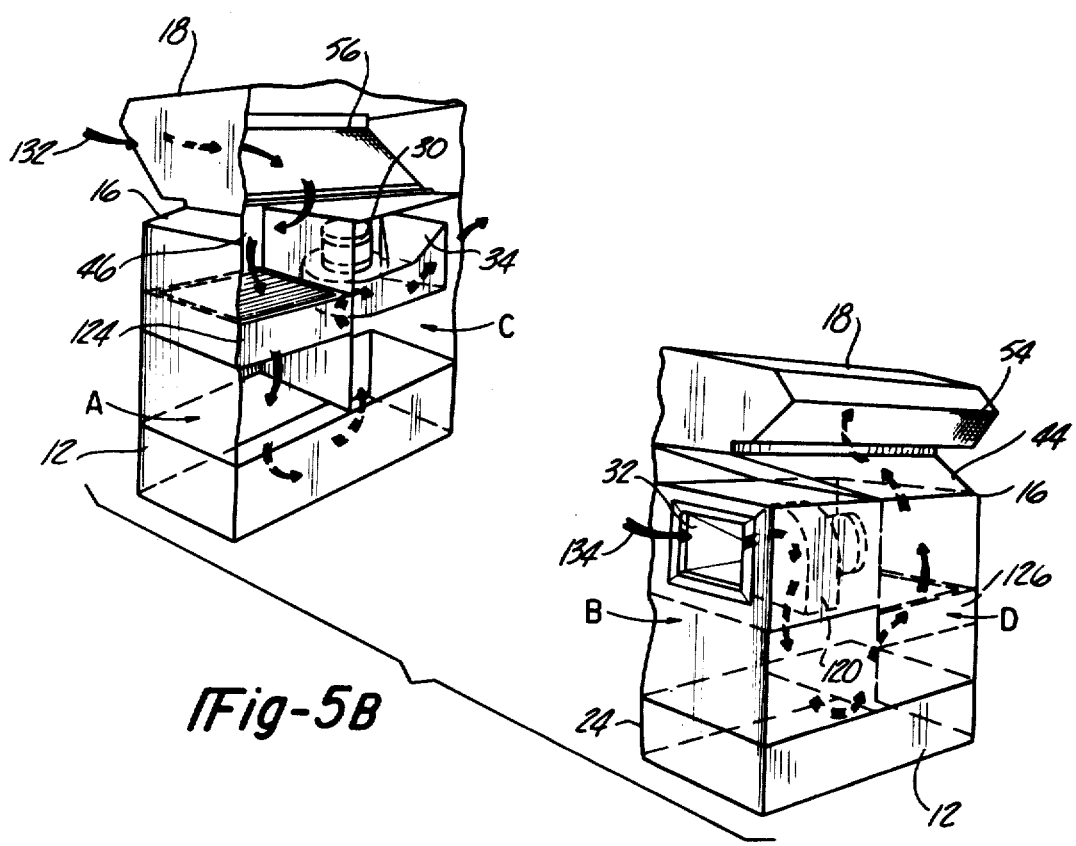
Fig-5A
Fig-5B

UNITARY MATRIX, VALVE AND FAN HOUSING FOR ENERGY RECOVERY

This application is a continuation of application Ser. No. 794,383, filed May 6, 1977, now U.S. Pat. No. 4,322,229.

INTRODUCTION

This invention relates to high performance ventilation systems and particularly to a ventilation system for a relatively small temperature controlled enclosure having the capability of recoving the high percentage of the thermal energy in the air exhausted from the ventilated area.

BACKGROUND OF THE INVENTION

Ventilating systems are commonly used to maintain environmental standards in industrial, commercial and farming facilities, such as foundries, factories, metal finishing areas, workshops, service areas, warehouses, meeting halls, recreational buildings, animal, nursery and feeder houses and other facilities of many diverse types. Ventilation systems for such facilities are necessary to remove excess heat, discharge pollutants and to maintain a healthful comfortable environment. Unfortunately, safety, health and economic consideration are at odds with one another in that air which has been heated or cooled at substantial expense is virtually thrown away by the conventional ventilation process. In the case of a heated facility, the exhaust air in the ventilation process contains not only the sensible energy expended in increasing the supply air temperature but the latent energy represented by the vaporized water required to adequately humidify. With great pressure on power producing utilities and the ever-increasing cost of fuels for heating and cooling, there is a great need to recover thermal energy from the exhaust air of all high performance ventilation systems.

One approach to thermal energy recovery in ventilation systems is disclosed in my patent application U.S. Ser. No. 600,620 filed July 31, 1975, now U.S. Pat. No. 4,049,404. That invention provided a low-cost, high performance ventilation system capable of supplying air to and exhausting air from a temperature-controlled area in a unidirectional flow pattern at approximately 8000 cubic feet per minute while at the same time recovering an extremely high percentage of thermal energy, both sensible and latent from exhausted air. The invention makes possible a unit of low initial cost which can be offset in fuel savings in a very short time in which waste heat, such as from lighting, motors and like devices is utilized and in which a unidirectional flow pattern through the work area maintains desired temperatures from floor to ceiling. The present invention represents an improvement over the subject matter of U.S. Ser. No. 600,620, now U.S. Pat. No. 4,049,404.

Prior art thermal energy recovery ventilating systems typically were designed for extremely large commercial buildings such as assembly plants, foundries, warehouses and the like and comprised several large housings which had to be interconnected with duct work. These housings typically were extremely heavy and required elaborate foundations and supports which had to be integrated ahead of time into the building's superstructure and occupied a substantial amount of roof spaces. Additionally, heavy construction equipment such as cranes were necessary to lift the housings to the roof. These systems were also relatively costly, not only to purchase but to interface with the existing structure and many manhours of labor were required to interconnect the necessary duct work and electrical wiring. It would be advantageous to have an energy-conserving ventilation system which was lightweight, compact in a single unit containing the matrices, valve and fans which could be applied to relatively smaller temperature controlled structures which heretofore found the prior art systems economically unfeasible. It is to this area that the present invention is directed.

BRIEF SUMMARY OF THE INVENTION

The subject invention provides an improved, compact, lightweight and low-cost high performance ventilation system capable of supplying air to and exhausting air from a thermally-controlled area in a unidirectional flow pattern while at the same time recovering an extremely high percentage of thermal energy, both sensible and latent, from the exhausted air. This is accomplished by a modular design which packages the thermal elements, valve, and intake/exhaust fans in a single housing which can be joined with the system's other modular components at the time of installation and interfaced with the building's electrical and duct work systems with a relatively minor expenditure of money and manhours.

In general, these objectives are accomplished by means of a matrix box which is partitioned into four chambers, some of which contain thermally absorbent matrices and some of which contain intake and exhaust fans. A regulable valve mechanism cyclically interconnects predetermined combinations of chambers thereby forming two thermally isolated air flow paths, one of which, during a first half-cycle of operation, exhausts air from the building through one matrix while the other supplies fresh outside air to the building after passing it through the other matrix. During a second half-cycle of operation, the valve is repositioned thereby forming two different thermally isolated air flow paths for supplying and exhausting air to and from the building.

Another feature of the invention is its modular construction. The matrix construction permits the matrix box to be supported in virtually any orientation and in any location with respect to its associated structure. The matrix box may, for example, rest upon the roof top, be suspended from the ceiling, or alternatively rest upon the floor of the building. This flexibility allows a system to be custom tailored to an individual user's needs.

A still further feature of the invention coincident with the compactness and light weight of the matrix box is the ability of a system embodying the invention to be adapted to an existing structure and ventilation system. The housing can be located almost anywhere within or without the structure to maximize thermal efficiency and cost effectiveness.

Still further features and advantages of the invention will become apparent from a reading of the following specification in which a specific embodiment of the invention is described in considerable detail.

BRIEF DESCRIPTION OF THE DRAWINGS

FIG. 1 is a perspective view of the preferred embodiment of the energy conserving ventilation system with a unitary matrix valve and fan housing;

FIG. 2(a) is a side plan view of the preferred embodiment of the invention in application in the roof mounted configuration;

FIG. 2(b) is an alternative embodiment of the invention in plan view illustrating a ceiling mounted energy conserving ventilation system;

FIG. 2(c) is another alternative embodiment of the invention in plan view illustrating a floor mounting of the energy conserving ventilation system;

FIG. 3 is a perspective view of the bottom of the matrix box illustrating the relationship of the matrix box chambers and the valve vane;

FIG. 5(a) is a broken perspective view illustrating the air flow through matrix chambers A and B during the second half-cycle of operation of the invention;

FIG. 5(b) is a perspective view of chambers C and D illustrating the air flow during the second half-cycle of operation of the invention;

FIG. 5(c) is a perspective view of chambers A and C illustrating the air flow during the first half-cycle of operation of the invention;

FIG. 5(d) is a perspective view illustrating the air flow through chambers B and D during the first half-cycle of operation of the invention;

DETAILED DESCRIPTION OF THE SPECIFIC EMBODIMENT

Figure 4:
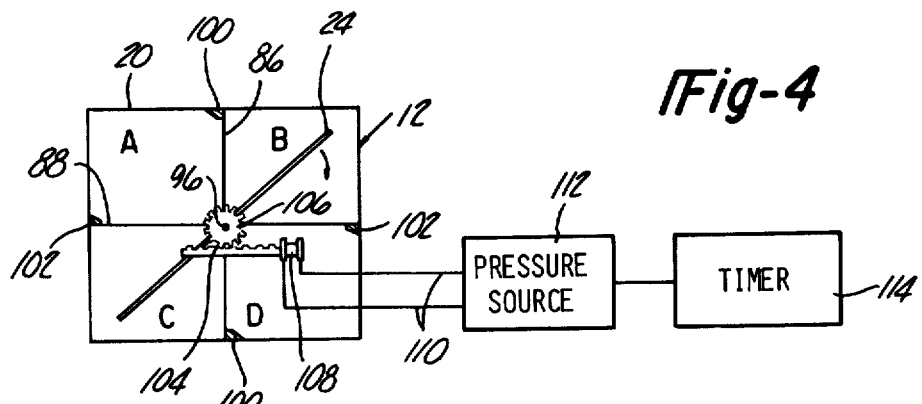
FIG. 4 is a bottom view of the vane assembly illustrating the details thereof.

Referring to FIG. 1 there is shown an exploded view and energy conserving ventilation (ECV) unit 10. The unit 10 comprises a valve assembly 12, matrix box 14, transition fitting 16 and weather hood 18. The valve assembly 12 comprises a rectangular body portion 20 and a base portion 22. Within the body portion 20 is disposed a vane 24 which is rotatably disposed within the housing 20, the details and function of which will be disclosed in detail below. The uppermost peripheral edge 26 of the housing 20 forms a seal which mates is a substantially conjugate relationship with edge 28 on the lowermost edge of the matrix box 14. The seal formed between edges 26 and 28 is substantially air-tight. The matrix box 14 comprises an outer housing 30 which is substantially rectangular in horizontal cross-section and has two ports 32 and 34 which are diagonally opposed from one another and located in the uppermost part of two laterally opposed walls of housing 30. Port 32 is designed to interface with the exhaust network of the structure within which the system is to be applied. Port 34 is intended for interfacing with the intake duct network of the building within which the device is to be employed. The matrix box 14 is partitioned internally into first, second, third and fourth vertically elongated chambers, A, B, C and D, respectively, which contain intake and exhaust fans and thermally absorbent matrices, the details of which will be disclosed below. The matrix box housing 30 has access covers 36 provided for the removal, cleaning, replacement and servicing of the internal components of the matrix box. The uppermost edge 38 of the matrix box 14 terminates in a flange 40 which matingly cooperates with a conjugate flange 40 on the lowermost edge of the transition fitting 16, thereby forming a substantially airtight seal. The transition fitting 16 provides an air passageway for only two of the four chambers within the matrix box 14. The two chambers that do not form air paths with the transition fitting are closed at the top 42, the details of which will be described below. The transition fitting 16 comprises two chamber openings 44 and 46 at its base and serves to interconnect the box 14 and hood 18. It is contemplated that the shape of the fitting can be altered in accordance with the orientation of the unit 10 within its intended structure. The uppermost edge 50 of transition fitting 16 terminates in a lip which matingly cooperates with a conjugate lowermost edge 52 on the weather hood 18, forming an airtight seal therewith. The weather hood 18 has two laterally opposed vent openings 54 and 56 which are adjacent to the lowermost edge 52 and diverge upwardly and away therefrom. The hood 18 has a crowned top surface 58 which is closed to prevent snow, rain and airborne contaminants from entering the vents 54 and 56. A central vertical partition 60 divides the hood 18 into two chambers 62 and 64. Chamber 44 of transition fitting 16 opens into chamber 62 of hood 18 and chamber 46 of transition fitting 16 opens into chamber 64 of weather hood 18. That is, air entering chamber 44 will exit through vent 54 and air entering chamber 46 will exit vent 56 and vice-versa. When fully assembled, the unit 10 will be substantially airtight with the exception of the ports 32 and 34 and vents 54 and 56. The valve assembly 12, matrix box 14, transition fitting 16 and weather hood 18 are constructed of sheet metal which is spotwelded or riveted together. However, it is contemplated that other material may be used.

Referring to FIG. 2(a), the preferred embodiment of the invention is illustrated in application. The unit 10 is fully assembled and rests upon the roof 66 of a temperature controlled enclosure. The building exhaust ducting 68 is mechanically connected to port 32 and the structure's distribution or intake ducting 70 is mechanically interconnected with port 34. As can be seen from the arrows, the air flow is in a unidirectional manner within the building and is drawn in and exhausted in cyclically alternating cycles through outside vents 54 and 56 of hood 18. Simple support means such as legs 72 interconnect the unit 10 and the roof 66.

Referring to FIG. 2(b), an alternative installation is illustrated wherein the unit 10 is suspended from the ceiling 66 of a temperature-controlled structure. The unit 10 is interconnected with the intake and exhaust ducts as described above. A two-chamber elbow duct and adapter 74 and 76 respectively interconnect the hood 18 and the matrix box 14 in place of the transition fitting illustrated above. The unit 10 can easily be suspended from the ceiling 66 by steel rods 78 or the like.

Referring to FIG. 2(c) still another alternative installation is illustrated. The unit 10 is located within the structure, and the supply or distribution ducting 70 mechanically interconnected to port 34 or the unit 10. Port 32 has a grill 80 in place of exhaust ducting. As in FIG. 2(a), the unit 10 is supported by legs 72 and stands on the floor 82 of the structure. A two-duct extension 84 mechanically interconnects the transition fitting 16 and hood 18 while passing through the roof 66.

Referring to FIG. 3, the internal details of the matrix box 14 are illustrated. Two planar divider panels 86 and 88 are disposed within the housing 30 and subdivided it into four quadrants or chambers A, B, C and D. The dividers 86 and 88 are disposed in vertical planes which are perpendicular to one another and parallel to the walls of the housing 30. Divider 86 is substantially parallel to side walls 90 and 92 of housing 30 and divider 88 is substantially parallel to side walls 94 and 96 of housing 30. The four chambers A, B, C and D are substantially square in horizontal cross-section and are vertically elongated. The chambers are substantially of the same dimensions. Port 32 opens into chamber B, and port 34 opens into chamber C, upper end parts 42 seal the upper end of chambers B and C. Chambers A and B are open at the top and enter chambers 46 and 44 of the transition fitting 16 respectively. The housing 20 of valve assembly 12 is shown in phantom to illustrate its orientation with respect to the matrix box 14. Valve vane 24 is illustrated in position for the first half-cycle of operation as will be discussed in detail below. With the vane 24 in this position, chambers B and D are open into one another through the housing 20 of valve assembly 12 and chambers A and C likewise open into one another through the other side of the housing 20 of the valve assembly 12. Chambers A and C are thermally isolated from chambers B and D when the vane 24 is in the illustrated position. In this position, two distinct air flow paths are formed, the details of which will be described below. Vane 24 rotates about its center pivot point 98 clockwise from the illustrated position to a second position shown in phantom 24' which is substantially ninety degrees clockwise from the original position. The position of the vane 24 shown in phantom is the orientation it assumes during the second half-cycle of operation of the system. In this position chambers A and B are open to one another and chambers B and D are likewise open to one another again forming two thermally isolated flow paths.

Referring to FIG. 4, the details of the valve assembly 12 are illustrated by a bottom view of the valve assembly 12 and matrix box 14. During the first half-cycle of operation, valve vane 24 is substantially parallel to partition 86. Vane 24 is prevented from counter-clockwise displacement by bumpers 100 which serve to seal the vane 24 with housing 20 and preventing air from passing between the airflow path defined by chambers A and C and the airflow path defined by chambers B and D. During the second half-cycle of operation the vane 24 rotates ninety degrees clockwise and comes to rest against bumpers 102 which again seal the vane 24 and housing 20 thereby preventing air flow between a first airflow path defined by chambers A and B and a second airflow path defined by chambers C and D. At the end of the second half-cycle, the vane 24 rotates counter-clockwise ninety degrees and assumes its original position. The valve 12 is controlled by a rack arm 104 meshing with the gear 106 on the vane pivot 96. The pivot 96 is supported by bearings located in the base portion 22 of valve 12. A double acting air cylinder 108 is connected through lines 110 to an air pressure source 112. A timer 114 periodically pulses the pressure source which in turn cyclically activates the valve 12.

Referring to FIGS. 5(a) and 5(b), the two air flow paths 116 and 118 are illustrated. Assuming weather conditions wherein the ambient temperature is lower than that of the temperature-controlled structure, during a second half-cycle of operation heated stale and contaminated air is drawn from the building into port 32 through the exhaust ducting by fan 120. Port 32 opens into chamber B. The air leaves the fan 120 and is forced downwardly into and out of that part of the matrix box 12 defined by end wall 122 and vane 24. The air passes into chamber A through heat retaining cartridge 124 and finally out through chamber 46 of transition fitting 16 and chamber 64 of weather hood 18. The exhaust air exits the unit through vent 56. During the same second half-cycle, air 116 is being drawn through vent 54 into chamber 62 of hood 18. The air is then drawn through chamber 44 of transition fitting 16 and into chamber D through cartridge 126, through that portion of valve assembly 12 that is defined by vane 24 and wall 128, into chamber C through fan 130 and out port 34 into the intake or distribution ducting of the enclosure. The cartridges 124 and 126 are formed from matrix material into a honeycomb having a large surface area-to-volume ratio. Fiberous organic material such as common construction grade paper is employed for its low cost, low pressure drop and capability of absorbing substantial quantities of both sensible and latent heat. At the beginning of the second half-cycle of operation, matrix 124 has little thermal energy stored in it. Its inside face being at substantially room temperature and its outside face being at substantially outside or ambient temperature. As heated contaminated air is drawn into chamber B and through to chamber A, through the matrix 124, the matrix 124 absorbs heat energy from the air stream which then passes to the outside. At the same time fresh air is being drawn into chamber D through cartridge 126 which has heat energy stored therein from a previous half-cycle. As the cool clean ambient air passes through cartridge 126 thermal energy is desorbed into the air stream. That air is then forced into the intake ducts at substantially room temperature. This process continues until cartridge 124 becomes substantially saturated with thermal energy and cartridge 126 becomes depleted of thermal energy. At that time, vane 24 switches position and the first half-cycle of operation begins.

Referring to FIG. 5(c) and 5(d) the two thermally isolated air flow paths 132 and 134 during the first half-cycle of operation are illustrated. Cool ambient air enters the hood 18 and passes through chamber 46 of transition fitting 16 into chamber A. The air passes through cartridge 124 and desorbs the thermal energy from it. The air stream then passes through the valve assembly 12 as described above and into chamber C. Fan 130 in chamber C forces the air out through port 34 into the distribution duct. At the same time warm contaminated air is drawn from the exhaust duct through port 32 into fan 120 within chamber B. The air passes through half of the valve assembly 12 as described above into chamber D. The air then passes through cartridge 126, upwardly through chamber 44 of transition fitting 16 and out of vent 54 of hood 18. The first half-cycle continues until cartridge 126 is saturated with thermal energy and cartridge 124 is substantially depleted of thermal energy. At that time, vane 24 returns to its initial position and the cycle begins again. The thermal cartridges 124 and 126 are constructed so as to have substantially the same peripheral dimensions as that of the inside surfaces of their respective chambers. That is, due to their nesting relationship, air passing through a given chamber must pass through the cartridge. Although the period of the above-described half-cycle vary depending upon the temperature differential between ambient and inside the structure, it has been found that a cycle time of seconds rather than minutes is advantageous in that it allows use of extremely compact ECV systems and associated cartridges. It is contemplated that, depending upon the desired air flow rate, building size and maximum temperature differential, more than one cartridge can be stacked in series within a given chamber to increase the system's thermal absorption and desorption capability. The cycle described above is substantially the same during summer conditions with the exception that the relatively warmer outside air is passed through a cartridge during the intake part of the half-cycle and the energy therein is stored in the cartridge. During the exhaust half-cycle that energy is desorbed into the exhaust air stream, thus keeping the enclosure relatively cooler thus reducing or eliminating the need for air conditioning.

Figure 6:
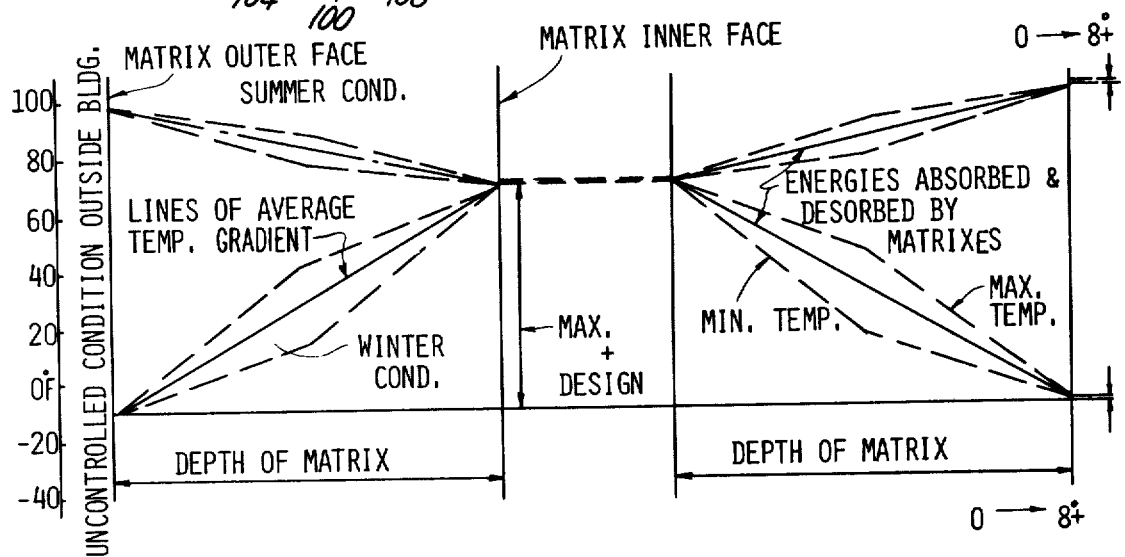
FIG. 6 is a graphical illustration of the temperature gradient and energy absorption and desorption for typical matrices.

FIG. 6 depicts on the left side the temperature gradient across the matrix for winter and summer conditions. In each case the matrix innerface is brought to the outside temperature of approximately seventy degrees. On the right, FIG. 6 shows the energy absorption of the same matrix.

Figure 7:
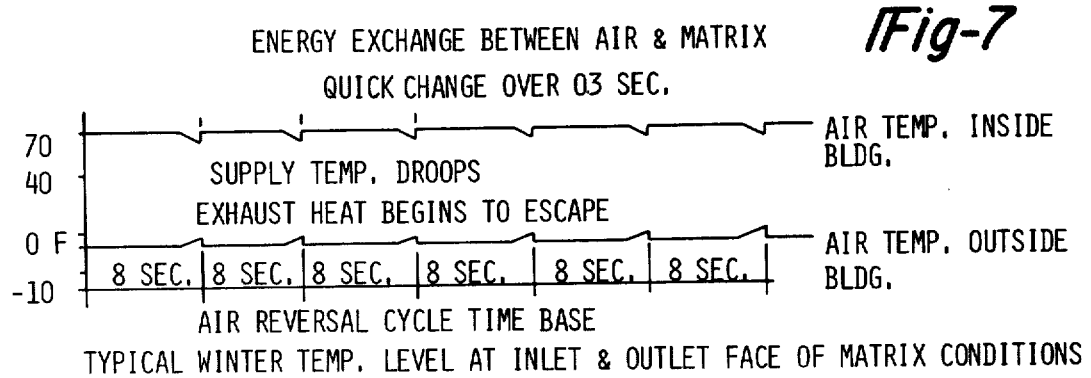
FIG. 7 is a graphical illustration of a matrix-time, temperature cycle over several cycles of operation.

FIG. 7 shows the relationship between inside and outside air temperatures for a ventilation system embodying the invention and set for eight second half-cycles.

The unit described above was designed to accommodate structures having an optimum ventilation rate of approximately 2,000 cubic feet per minute. However, it is contemplated that obvious changes in the matrix size, fan capacity, duct size, matrix thickness and the like can be made to accommodate buildings with greater and lesser requirements. It is to be understood that the invention has been described with reference to specific embodiments which provide the features and advantages previously described and that such specific embodiments are susceptible to modification as will be apparent to those skilled in the art. Accordingly, the foregoing description is not to be construed in a limiting sense.

The embodiments of the invention in which an exclusive property or privilege is claimed are defined as follows:

1. An energy ventilation system for an enclosure, said system including:
   supply and exhaust ducting extending within said enclosure;
   a matrix box consisting of an outer open ended housing and internal intersecting and longitudinally-extending partition walls whereby the housing is partitioned into four quadrants, each defining an elongated channel within said outer housing;
   air supply fan means mounted in a first of said channels producing air flow therethrough;
   exhaust fan means mounted in a second of said channels producing air flow therethrough;
   a heat storing matrix located in each of a third and fourth of said channels;
   valve means alternately positionable to establish an air flow path through each of said first and second channels and opposite ones of said third or fourth channels, said valve means including a unitary moveable vane positioned at one end of said matrix box housing contiguous with said partitions and moveable between a first position wherein the vane is in alignment with one of said partition walls and a second position wherein the vane is in alignment with the other of said partition walls to establish air flow paths through said first, second, third and fourth channels;
   means for cyclically moving said valve means between said alternate positions;
   transition housing means disposed at the other end of said matrix box housing for connecting each of said third and fourth channels to a fresh air source;
   means connecting said first channel to said supply ducting; and
   means connecting said second channel to said exhaust ducting;
   whereby said cyclical operation of said valve means causes alternate exhaust and supply air flow through each of said third and fourth channels and over each of said heat storing matrixes and whereby heat may be exchanged between said exhaust air flow and said supply air flow.

2. The ventilation system according to claim 1 wherein said transition housing means connecting said third and fourth channel to a fresh air source further includes a separate weather shield mounted to said transition housing means and having outlets in communication with a respective one of said transition passages.

* * * * *